PROGRAMMABLE DIGITAL FILTER APPARATUS

Filed Dec. 21. 1970 7 Sheets-Sheet 1

INVENTOR
P. A. SCHUSTER
BY Gerard E. Murphy
ATTORNEY

FIG. 4

| | | |
|---|---|---|
| | 1 | STORE APPLIED SAMPLE IN REGISTER 112 |
| EX+I | 2 | MULTIPLY X BY E; STORE PRODUCT IN ACCUMULATOR 156 |
| | 3 | ADD I TO CONTENTS OF ACCUMULATOR 156;STORE SUM IN ACCUMULATOR 156 |
| | 4 | TRANSFER CONTENTS OF ACCUMULATOR 156 TO REGISTER 112 |
| DY+I | 5 | MULTIPLY Y BY D; STORE PRODUCT IN ACCUMULATOR 156 |
| | 6 | ADD I TO CONTENTS OF ACCUMULATOR 156; STORE SUM IN ACCUMULATOR 156 |
| | 7 | TRANSFER CONTENTS OF ACCUMULATOR 156 TO REGISTERS 112 AND 122 |
| CX+J | 8 | MULTIPLY X BY C; STORE PRODUCT IN ACCUMULATOR 156 |
| | 9 | ADD J TO CONTENTS OF ACCUMULATOR 156; STORE SUM IN ACCUMULATOR 156 |
| | 10 | TRANSFER CONTENTS OF ACCUMULATOR 156 TO REGISTER 122 |
| BY+J | 11 | MULTIPLY Y BY B; STORE PRODUCT IN ACCUMULATOR 156 |
| | 12 | ADD J TO CONTENTS OF ACCUMULATOR 156; STORE SUM IN ACCUMULATOR 156 |
| | 13 | TRANSFER CONTENTS OF ACCUMULATOR 156 TO REGISTER 122 |
| | 14 | SHIFT REGISTERS 132 AND 142 |
| AJ | 15 | MULTIPLY J BY A; STORE PRODUCT IN ACCUMULATOR 156 |
| | 16 | TRANSFER CONTENTS OF ACCUMULATOR TO REGISTER 112 |

FIG. 6A

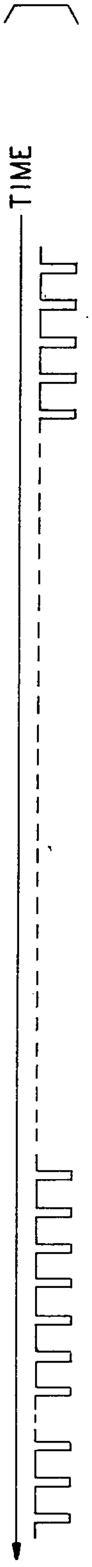

FIG. 6B FIG. 6C

| | | READ SOURCE | ENABLE I | READ I | ENABLE J | READ J | READ X | READ Y | ENABLE ACC | MODE | CLEAR | READ ACC | SHIFT | ENABLE OUTPUT | | SIGN | MAGNITUDE |
|---|---|---|---|---|---|---|---|---|---|---|---|---|---|---|---|---|---|
| | LOAD DATA IN I | 1 | 1 | 0 | 0 | 0 | 0 | 0 | 0 | 0 | 0 | 0 | 0 | 0 | | 0 | 0 |
| EX+I | FIRST MULT. CYCLE | 0 | 0 | 0 | 0 | 0 | 1 | 0 | 1 | 1 | 0 | 0 | 0 | 0 | E | $S_E$ | $\delta_0$ |
| | SECOND MULT. CYCLE | 0 | 0 | 0 | 0 | 0 | 1 | 0 | 1 | 1 | 1 | 0 | 0 | 0 | | $S_E$ | $\delta_1$ |
| | THIRD MULT. CYCLE | 0 | 0 | 0 | 0 | 0 | 1 | 0 | 1 | 1 | 1 | 0 | 0 | 0 | | $S_E$ | $\delta_2$ |
| | ⋮ | | | | | | | | | | | | | | | | |
| | LAST MULT. CYCLE | 0 | 0 | 0 | 0 | 0 | 1 | 0 | 1 | 1 | 1 | 0 | 0 | 0 | | $S_E$ | $\delta_{n-1}$ |
| | SHIFT LEFT | 0 | 0 | 0 | 0 | 0 | 0 | 0 | 1 | 0 | 0 | 0 | 0 | 0 | | 0 | 0 |
| | ADD I | 0 | 0 | 1 | 0 | 0 | 0 | 0 | 1 | 1 | 1 | 0 | 0 | 0 | | 0 | 1 |
| | TRANSFER TO I | 0 | 1 | 0 | 0 | 0 | 0 | 0 | 0 | 0 | 1 | 1 | 0 | 0 | | 0 | 0 |
| DY+I | FIRST MULT. CYCLE | 0 | 0 | 0 | 0 | 0 | 0 | 1 | 1 | 1 | 0 | 0 | 0 | 0 | D | $S_D$ | $\delta_0$ |
| | ⋮ | | | | | | | | | | | | | | | | |
| | LAST MULT. CYCLE | 0 | 0 | 0 | 0 | 0 | 0 | 1 | 1 | 1 | 1 | 0 | 0 | 0 | | $S_D$ | $\delta_{n-1}$ |
| | SHIFT LEFT | 0 | 0 | 0 | 0 | 0 | 0 | 0 | 1 | 0 | 0 | 0 | 0 | 0 | | 0 | 0 |
| | ADD I | 0 | 0 | 1 | 0 | 0 | 0 | 0 | 1 | 1 | 1 | 0 | 0 | 0 | | 0 | 1 |
| | TRANSFER TO I & J | 0 | 1 | 0 | 1 | 0 | 0 | 0 | 0 | 0 | 1 | 1 | 0 | 0 | | 0 | 0 |
| CX+J | FIRST MULT. CYCLE | 0 | 0 | 0 | 0 | 0 | 1 | 0 | 1 | 1 | 0 | 0 | 0 | 0 | C | $S_C$ | $\delta_0$ |
| | ⋮ | | | | | | | | | | | | | | | | |
| | LAST MULT. CYCLE | 0 | 0 | 0 | 0 | 0 | 1 | 0 | 1 | 1 | 1 | 0 | 0 | 0 | | $S_C$ | $\delta_{n-1}$ |
| | SHIFT LEFT | 0 | 0 | 0 | 0 | 0 | 0 | 0 | 1 | 0 | 0 | 0 | 0 | 0 | | 0 | 0 |
| | ADD J | 0 | 0 | 0 | 0 | 1 | 0 | 0 | 1 | 1 | 1 | 0 | 0 | 0 | | 0 | 1 |
| | TRANSFER TO J | 0 | 0 | 0 | 1 | 0 | 0 | 0 | 0 | 0 | 1 | 1 | 0 | 0 | | 0 | 0 |
| BY+J | FIRST MULT. CYCLE | 0 | 0 | 0 | 0 | 0 | 0 | 1 | 1 | 1 | 0 | 0 | 0 | 0 | B | $S_B$ | $\delta_0$ |
| | ⋮ | | | | | | | | | | | | | | | | |
| | LAST MULT. CYCLE | 0 | 0 | 0 | 0 | 0 | 0 | 1 | 1 | 1 | 1 | 0 | 0 | 0 | | $S_B$ | $\delta_{n-1}$ |
| | SHIFT LEFT | 0 | 0 | 0 | 0 | 0 | 0 | 0 | 1 | 0 | 0 | 0 | 0 | 0 | | 0 | 0 |
| | ADD J | 0 | 0 | 0 | 0 | 1 | 0 | 0 | 1 | 1 | 1 | 0 | 0 | 0 | | 0 | 1 |
| | TRANSFER TO J | 0 | 0 | 0 | 1 | 0 | 0 | 0 | 0 | 0 | 1 | 1 | 0 | 0 | | 0 | 0 |
| | SHIFT MEMORIES | 0 | 0 | 0 | 0 | 0 | 0 | 0 | 0 | 0 | 0 | 0 | 1 | 0 | | 0 | 0 |
| AJ | FIRST MULT. CYCLE | 0 | 0 | 0 | 0 | 0 | 0 | 0 | 1 | 1 | 0 | 0 | 0 | 0 | A | $S_A$ | $\delta_0$ |
| | ⋮ | | | | | | | | | | | | | | | | |
| | LAST MULT. CYCLE | 0 | 0 | 0 | 0 | 0 | 0 | 0 | 1 | 1 | 1 | 0 | 0 | 0 | | $S_A$ | $\delta_{n-1}$ |
| | TRANSFER TO I | 0 | 1 | 0 | 0 | 0 | 0 | 0 | 0 | 0 | 1 | 1 | 0 | 0 | | 0 | 0 |

United States Patent Office 3,706,076
Patented Dec. 12, 1972

3,706,076

PROGRAMMABLE DIGITAL FILTER APPARATUS

Paul Alfred Schuster, Parsippany, N.J., assignor to Bell Telephone Laboratories, Incorporated, Murray Hill, N.J.

Filed Dec. 21, 1970, Ser. No. 99,747
Int. Cl. H04b 3/04
U.S. Cl. 340—172.5 15 Claims

ABSTRACT OF THE DISCLOSURE

A digital filter with data memories arranged in the configuration of a filter of relatively low order (e.g., second order) and with a single time-shared arithmetic unit under the control of instruction and coefficient memories. The data, instruction, and coefficient memories of the filter are arranged to permit the realization of filter transfer functions of arbitrary order on data from an arbitrary number of sources. The filter is readily programmable with respect to the order of the filter functions to be realized, the number of sources of data to be processed, and the filter coefficients to be used.

GOVERNMENT CONTRACT

The invention herein claimed was made in the course of or under a contract with the Department of the Navy.

BACKGROUND OF THE INVENTION

Field of the invention

This invention relates to signal filtering apparatus and, more particularly, to the class of discrete-time signal filters known as digital filters. For a general discussion of digital filters and some of their applications, reference is made to Digital Processing of Signals by B. Gold and C. M. Rader (McGraw-Hill Book Company, 1969).

Description of the prior art

Digital filters process signal information by performing a predetermined set of arithmetic operations on digitally coded samples of that information. In conventional digital filters the information to be processed is sampled at a constant rate and each sample converted to a digital word, usually consisting of a number of binary digits (bits). Signals representative of these digitally coded samples are applied to the digital filter at the sampling rate, the reciprocal of which is the sampling interval.

The digital filter itself generally comprises delay units (shift registers), amplifiers (multipliers), and adders. In the direct canonic form (see FIG. 2.20, p. 42, of the above reference) the delay units in the filter network are connected in series, each delaying digital words applied to it by one sampling interval. From each interconnection of the delay units there is, in general, one signal path leading back to a first adder, to which the signal samples to be processed by the filter are also applied, and one signal path leading forward to a second adder. Each of these signal paths includes a multiplier for multiplying the digital words applied thereto by an appropriate filter coefficient. The digitally coded output signal of the first adder is applied to the first delay unit in the series of delay units and the digital words represented by that signal are shifted forward from one delay unit to the next at the sampling rate. The digitally coded output signal of the second or feed-forward adder is the output signal of the filter. The digital words represented by this signal likewise appear at the sampling rate.

Among the advantages of digital filters as signal processing devices is the fact that one such filter can be made suitable for the simultaneous processing of data from several sources. This is generally accomplished by applying samples from each of an arbitrary number, $q$, of sources to the filter in a predetermined sequence (i.e., by time-division multiplexing the samples). Each delay unit is provided with capacity for the simultaneous serial storage $q$ data words, one associated with each source. If the filter coefficients remain constant, data from all sources will be subjected to the same filter transfer function. By providing several sets of filter coefficients, it is possible to process data from each source using a different transfer function. Other than extending the capacity of the delay units, no other changes in filter configuration are necessitated by multiplexing data from a plurality of source.

The complexity of the filter transfer function or functions to be realized determines the complexity of the required filter network. The higher the order of the transfer functions the more delay units and signal paths are required in the filter. In general, the complexity or "order" of a digital filter transfer function is directly related to the number of delay units employed in the filter network. Thus, a second order transfer function is realized using a second order filter network, i.e., a network having at least two serially connected delay units.

As discussed in "An Approach to the Implementation of Digital Filters" by L. B. Jackson et al. (IEEE Transactions on Audio and Electroacoustics, vol. AU-16, No. 3, September 1968, pp. 413–421), the filter organization discussed above (i.e., the direct canonic form) is rarely used for higher order filter functions because accuracy requirements on the filter coefficients are usually too severe. Other forms (for example, the cascade form shown in FIG. 2 in the reference by Jackson et al.) have therefore been developed in which these accuracy requirements are eased. The coefficients required for use in cascade form filters are different than, but readily derived from, those required for use in comparable canonic direct form filters.

In the cascade form a plurality of direct canonic filter sections each having relatively low order (e.g., second order) are connected in series so that the output words of each section are applied to the succeeding filter section as input words. If all of the sections comprising a cascade filter are second order sections, the order of the filter as a whole will in general be twice the number of such sections. Not only does the cascade form ease accuracy requirements on filter coefficients, it also makes possible the fabrication of filters of arbitrary order from any number of standardized (i.e., second order) filter sections.

Both the direct canonic and the cascade forms of digital filters require the same number of delay units and arithmetic components for filters of a given order. At the speeds at which such filters can process data, economical use can be made of all these components only if there is a need for high speed data processing (i.e., the processing of samples from many sources each sampled at a relatively high rate). This economic consideration is especially important with respect to the arithmetic components of such filters which, even with integrated circuit technology, are relatively costly.

It is therefore an object of this invention to provide digital filtering apparatus in which fewer arithmetic components are required.

It is a more particular object of this invention to provide digital filtering apparatus with the advantages of digital filters of the cascade form in which a single arithmetic unit performs all the required arithmetic operations on a time-shared basis.

It is another object of this invention to provide a digital filter with a single time-shared arithmetic unit.

As has been mentioned, conventional cascade digital filters can be made up of any number of identical filter sections in order to realize transfer functions of arbitrary order. Once fabricated, however, such filters are not readily adapted to the realization of transfer functions with order other than the order for which they were constructed. The number of cascaded sections is effectively an upper bound on the order of realizable filter functions. When lower order functions are desired, idle filter sections cannot be readily put to any other use, e.g., processing data from additional sources. Similarly, the capacity of the delay units of such filters governs the number of sources from which data can be processed. Capacity of this kind which is unused is also unavailable for other purposes, e.g., the realization of higher order filter function.

It is therefore another object of this invention to provide digital filtering apparatus which is readily programmable with respect to the order of the filter functions realized and the number of sources from which data is to be processed.

It is yet another object of this invention to provide a digital filter in which filter capacity unused for the processing of data from a given source can be readily put to use in processing data from other sources.

It is yet another object of this invention to provide a digital filter in which filter capacity not devoted to realizing higher order filter functions can be utilized to process data from additional sources and vice versa.

As is well known, digital filters can be constructed to perform either serial or parallel arithmetic. This is equally true of filters constructed in accordance with the principles of this invention. However, parallel arithmetic has the advantage that, when it is employed, word size or length and hence the accuracy of filter computations can generally be determined independently of other design considerations, i.e., sampling rate and number of data sources in conventional filters and, in filters of the type disclosed herein, filter function order as well. This desirable flexibility of design can best be taken advantage of if the filter configuration is modular with respect to word length, i.e., if a filter with any given computational accuracy can be constructed from a predetermined number of identical filter modules.

It is therefore a further object of this invention to provide digital filtering apparatus which, when constructed to perform parallel arithmetic, is modular with respect to the length of the data words to be processed.

SUMMARY OF THE INVENTION

These and other objects of this invention are accomplished in accordance with the principles of the invention by means of two one word data storage devices and any number, $m$, of multistage shift register memories, one of the one word storage devices and the shift registers being connected in series. From each of the one word storage devices and from the output stage of each of the shift registers data words stored therein can be applied under the control of signals from an instruction memory to an arithmetic unit. The arithmetic unit, also under control of signals from the instruction memory and from a coefficient memory, can perform any of the arithmetic operations required in digital filters. Data words computed in the arithmetic unit can be applied to either or both of the one word storage devices, again under control of signals from the instruction memory.

Limited only by the size of the shift registers and the time which can be devoted to the processing of any one given signal sample, the foregoing apparatus can be programmed to perform an arbitrary number, $p$, of cascaded filtering operations each of relatively low order $m$ on samples from each of an arbitrary number, $q$, of sources, the samples being presented to the filter in the usual sequence. Briefly, the processing of a typical sample is as follows: A sample is applied to the filter and stored in the one of the one word storage devices which is connected in series with the shift register memories. The data words in the final or output stage of each of the multistage shift registers are sequentially applied to the arithmetic unit wherein each is multiplied by an appropriate feedback filter coefficient. The resulting products are summed with the stored sample to produce an output word equivalent to that produced by the feedback adder in a prior art filter section. That output word is stored in both of the one word storage devices. The shift register output words are again sequentially applied to the arithmetic unit where each is multiplied by an appropriate feed-forward coefficient. Each product thus generated is added to the contents of the one word storage device which is not serially connected to the shift registers. The contents of the serially connected devices are then shifted so that the former contents of the serially connected one word storage device is moved to the first stage of the first of the shift registers and the remaining data stored in the shift registers correspondingly displaced. Thereafter, the data word stored in the storage device which was not shifted as above is applied to the arithmetic unit for multiplication by an appropriate scale factor and the resulting product applied to the serially connected one word storage device. Since this last quantity is equivalent to that produced by the first general $m^{th}$ order filter section in a filter made up of cascaded $m^{th}$ order filter sections and since, by virtue of earlier cycles of filter operation, the data words now appearing in the output stages of the shift registers are those which would appear in the output stages of the shift registers in the second of such cascaded $m^{th}$ order filter sections, the data now available for application to the arithmetic unit of the filter is that on which the arithmetic operations of the second cascaded $m^{th}$ order filter section must be performed. Accordingly, all the foregoing operations are repeated to realize a second cascaded $m^{th}$ order filter operation. This process is continued until $p$ $m^{th}$ order filter operations have been performed. At that time the final $m^{th}$ order section output word is extracted from the serially connected one word storage device and a newly applied sample stored in its place. This new sample may be either from the same source, in the event that samples from only one source are being filtered, or it may be from the next of several sequentially sampled sources. In general, $p$ successive $m^{th}$ order filter operations can be performed on samples from each of $q$ sources where the number of data words which can be simultaneously stored in each of the shift registers is at least equal to the product of $p$ times $q$.

Since a basic operation (i.e., a filtering operation of relatively low order $m$) is being repeatedly performed, the filter is programmable wtih respect to $p$ and $q$ simply by means of changes in those instructions stored in the instruction memory which control when data words are to be recycled or new samples taken in. The filter functions realized can be further altered by changing the coefficients stored in the coefficient memory.

When constructed to perform parallel arithmetic on data words stored in parallel, filters constructed according to the principles of this invention are highly modular. By this it is meant that such filters comprise a plurality of identical filter modules, each performing the required operations on one arithmetic place of the data being processed. Accordingly, filters with any desired degree of computational accuracy can be constructed by connecting an appropriate number of modules in parallel.

Further features and objects of this invention, its nature, and various advantages, will be more apparent upon consideration of the attached drawing and the following detailed description of the invention.

BRIEF DESCRIPTION OF THE DRAWING

FIG. 4 is a tabular representation of the algorithm by means of which a second order filtering operation is realized in the digital filter of FIG. 2;

FIG. 6A illustrates the sequence of timing pulses applied to the instruction and coefficient memories of the digital filter of FIG. 2;

FIG. 6B is a tabular representation of the state of the portion of the instruction memory of FIG. 2 required to produce one second order filtering operation in the filter of FIG. 2;

FIG. 6C is a tabular representation of the state of the portion of the coefficient memory of FIG. 2 required to produce one second order filtering operation in the filter of FIG. 2;

DETAILED DESCRIPTION OF THE INVENTION

Figure 1:
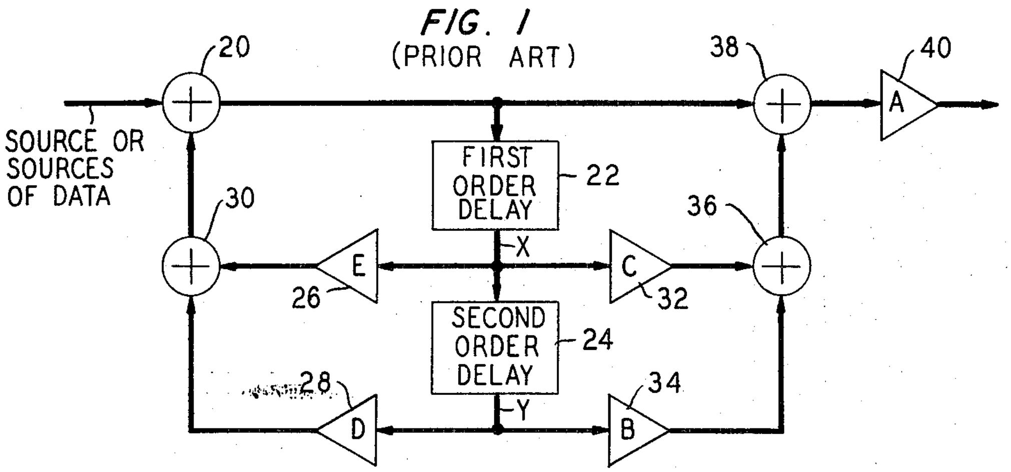
FIG. 1 is a block diagram of a prior art, general, second order digital filter.

In the prior art general second order filter of FIG. 1, signals representative of sequential digitally coded signal samples from one or more sources are applied to adder 20. Adder 20 combines each such sample with a simultaneously applied digitally coded data word produced by adder 30 to produce a series of output words which is applied to first order delay unit 22 and to adder 38. First order delay unit 22, which may be a multistage shift register with capacity for the simultaneous storage of as many data words as there are sources being sampled, delays each word applied to it by one sampling interval, i.e., the period of time between the application of any two samples from a given source. In practice this delay may have to be adjusted to compensate for unavoidable delay in the performance of the required arithmetic operations. Each word thus delayed by delay unit 22 is thereafter delayed for a second similar interval by second order delay unit 24, which may be a device similar to delay unit 22. For convenience the words appearing at any given time in the final or output stages of delay units 22 and 24 are designated quantities X and Y, respectively. Each of quantities X and Y are multiplied in multipliers 26 and 28 by feedback filter coefficients E and D, respectively. Each simultaneously generated pair of these product words is algebraically combined by adder 30 and the result applied to adder 20 as mentioned above. Quantities X and Y are also multiplied by feed-forward filter coefficients C and B by multipliers 32 and 34, respectively. Each simultaneously generated pair of these products is algebraically combined by adders 36 and 38 with the simultaneously generated output word from adder 20. Finally, each of the output words produced by adder 38 is multiplied in multiplier 40 by scale factor A.

As has been mentioned, higher order filter functions can be realized by cascading or serially connecting filters like the one shown in FIG. 1. In such cascaded filters, basically the same operations are performed in each second order filter "section," each section operating on the words produced by the preceding section. The values of coefficients A through E used in each section are, of course, unique.

Figure 2:
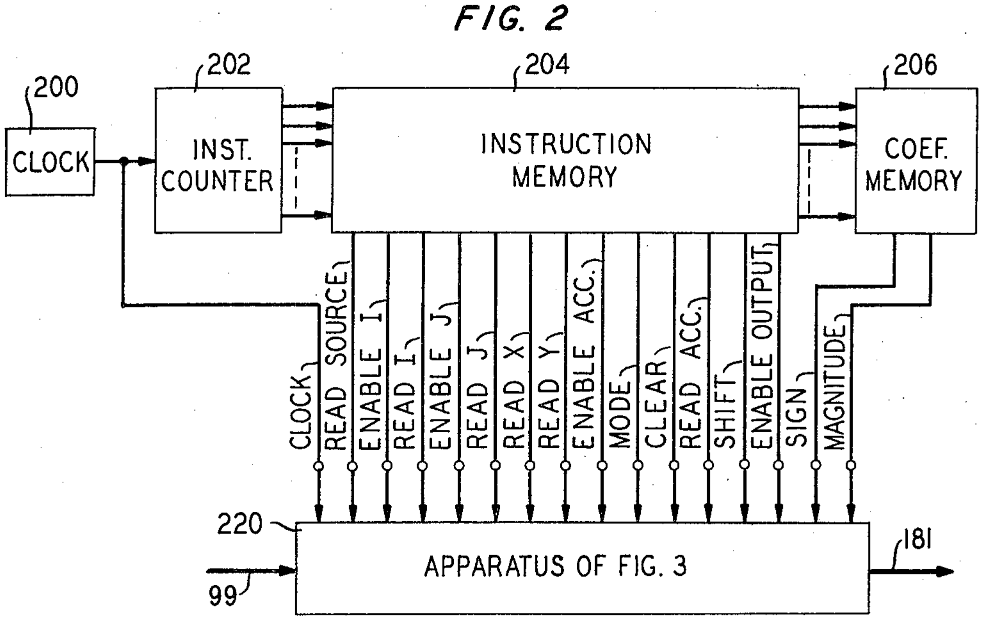
FIG. 2 is a block diagram of a digital filter constructed in accordance with the principles of this invention.

The filter of FIG. 2, constructed in accordance with the principles of this invention, is similar in performance to such a cascaded filter. As shown in FIG. 2, this filter comprises control apparatus (including clock 200, instruction counter 202, instruction memory 204, and coefficient memory 206) and data processing unit 220. The above-mentioned control apparatus generates a plurality of bi-level control voltages applied to processing unit 220 by way of the labelled terminals (e.g., terminal CLOCK) shown in FIGS. 2 and 3. Since a discussion of the generation of these control signals will be made more meaningful by an understanding of the apparatus they are employed to control, data processing unit 220 will be discussed in detail before further discussion of this control apparatus.

Figure 3:
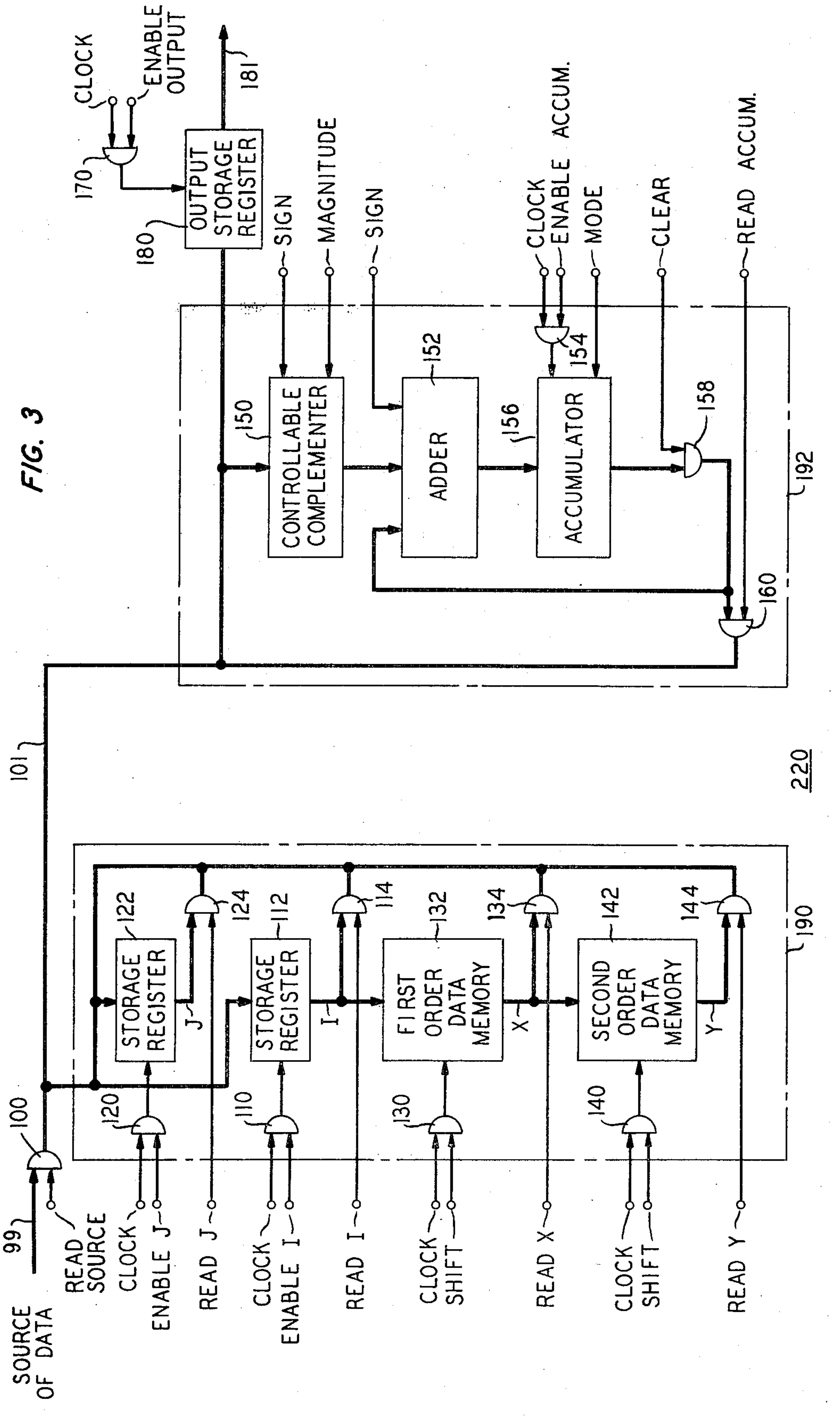
FIG. 3 is a block diagram of the data processing portion of the filter of FIG. 2.

Data processing unit 220 is shown in detail in FIG. 3. As shown in that figure, this apparatus comprises an input device 100, a data storage unit 190, an arithmetic unit 192, and apparatus 180 for applying output words to any suitable utilization device or devices. Any binary coded data word applied to input leads 99 may be applied to storage unit 190 by enabling input device 100. Depending on whether data is to be stored and manipulated serially or in parallel, input device 100 may be either a single AND gate or a plurality of commonly controlled AND gates, respectively. In the latter case, there is one AND gate for each binary place of the applied data. Similarly, connections over which data words pass (e.g., leads 99) may be a single lead if these words are to be manipulated serially (i.e., bit by bit) or a plurality of parallel leads, one for each binary place, if the words are to be manipulated in parallel. Advantageously, two's-complementary binary coding is employed for all applied and stored data. For a general discussion of this well-known form of binary coding and its arithmetic properties, reference is made is made to Chapter 3 of The Logic of Computer Arithmetic by Ivan Flores (Prentice-Hall, Inc., 1963). Input device 100 is enabled by application of a gate enabling control voltage to terminal READ SOURCE. Since this control signal is one of those generated by the control apparatus of FIG. 2, the terminal labelled READ SOURCE in FIG. 3 is the same as or is common with the similarly labelled terminal shown in FIG. 2.

Storage unit 190 includes two storage registers 112 and 122 each capable of storing one applied data word. For future convenience, the quantities stored in these registers are designated quantities I and J, respectively. Depending on whether the mode of operation of the filter is serial or parallel, these registers may each be a circulating memory or a plurality of bistable multivibrator devices, respectively. In any event, registers 112 and 122 are preferably devices of the type which store an applied quantity only in response to a separately applied clock or control pulse.

Storage unit 190 also includes two multiword data memories 132 and 142 which are connected in series with storage register 112. Again, if the filter is to operate in the serial mode, each of these memories may comprise a single multistage shift register with circulating storage for the final or output quantity whereas if the parallel mode is employed, each memory may comprise a plurality of shift registers, one for each binary place of the words to be stored. These devices are also preferably of the type which shift their contents by the amount necessary to store an applied data word in response to a separately applied clock or control pulse. Because data memories 132 and 142 perform a function analogous, though not identical, to that performed by delay units 22 and 24 in the filter of FIG. 1, the quantities appearing at any given time in the final or output stages of each of these devices are designated X and Y, respectively, in the same manner that the comparable output quantities of delay units 22 and 24 were designated.

Two storage registers 112 and 122 are employed because a recursive quantity stored in register 112, serially connected to multiword data memories 132 and 142, must be maintained until after data in multiword memories 132 and 142 have been shifted. However, a nonrecursive quantity must also be computed and maintained before the multiword data memories are shifted. Accordingly, a second storage register 122 is provided to maintain the nonrecursive quantity. In addition, the second storage register holds intermediate quantities obtained in the computation of the nonrecursive quantity.

The clock pulses mentioned above in connection with devices 112, 122, 132 and 142 occur in a clock or timing signal which is one of the several control signals generated by the control apparatus of FIG. 2. This control signal is applied to all of terminals CLOCK in FIG. 3 which are common with terminal CLOCK in FIG. 2. Selected pulses in this timing signal may be applied to any of devices 112, 122, 132 and 142 by enabling the appropriate one of AND gates 110, 120, 130, or 140. Any of these gates may be enabled by applying a gate enabling voltage to the appropriate one of terminals ENABLE I, ENABLE J, or SHIFT. These gate controlling voltages are also among the signals generated by the control apparatus of FIG. 2. Accordingly, terminals ENABLE I, ENABLE J, and SHIFT are all respectively common in FIGS. 2 and 3.

It is to be noted that because the shifting of both of memories 132 and 142 are controlled from a single control point (i.e., terminal SHIFT), both of these devices shift simultaneously. Since, in the course of shifting, each of these devices takes in or stores in its first or input stage the word applied to it immediately before the shift, such a shift will cause memory 132 to store quantity I in its input stage and memory 142 to similarly store former quantity X.

Any one of quantities I, J, X, or Y may be applied to arithmetic unit 192 by way of bus 101 by enabling the appropriate one of gating devices 114, 124, 134, or 144, respectively. Each of these devices is similar to input device 100, described above. Any of them may therefore be enabled by the application of a gate enabling control voltage to the appropriate one of control terminals READ I, READ J. READ X, or READ Y. Like the other control signals mentioned above, these voltages are generated by the control apparatus of FIG. 2. Accordingly, terminals READ I, READ J, READ X, and READ Y are respectively common in FIGS. 2 and 3.

Arithmetic unit 192 includes complementer 150, adder 152, accumulator 156, and gating devices 158 and 160. Generally, this apparatus is capable of performing addition or subtraction operations on binary two's-complement coded data words applied thereto. Although by itself adder 152 is only capable of adding two applied quantities (i.e., the data word produced by complementer 150 and the contents of accumulator 156), any data word applied to arithmetic unit 192 can be changed in sign before application to adder 152 to achieve the subtraction of that data word from the contents of accumulator 156. As is well known any two's-complement coded quantity (whether positive or negative) can be reversed in sign by two's-complementing that quantity. In arithmetic unit 192 this two's-complementation is accomplished when required, by complementer 150 and by the application of an appropriate signal to adder 152 by way of terminal SIGN.

Arithmetic unit 192 is also capable of multiplying any applied data word by a positive or negative sign-magnitude coded multiplier quantity, the bits of which are sequentially applied to unit 192 by way of terminals SIGN and MAGNITUDE. These multiplier quantities are, of course, the filter coefficients (e.g., quantities A through E). As performed by arithmetic unit 192, multiplication by such positive or negative quantities generally involves selected repeated addition or subtraction, respectively, of the two's-complement coded multiplicand quantity. Details of these arithmetic operations are provided below.

Turning to a more detailed discussion of arithmetic unit 192, complementer 150 is a logic circuit which performs any of several operations on data words applied to it in response to bilevel control signal voltages applied to control terminals SIGN and MAGNITUDE. When a control voltage of a first level (arbitrarily designated the binary one level or simply binary one) is applied to terminal MAGNITUDE, complementer 150 passes either the data word applied to it or the one's complement of that data word depending on whether a control voltage of a first or second level, respectively, is applied to terminal SIGN. These levels of the signal applied to terminal SIGN are arbitrarily designated the binary zero and one levels (or simply binary zero and one), respectively. Advantageously these levels are compatible with the signal levels employed in the coding of the data words being processed. As is well known, the one's complement of an applied data word can be converted to the more convenient two's-complement of that word by adding binary one to the least significant binary place of the one's-complement word. This is accomplished by applying the control signal applied to terminal SIGN to adder 152 as an arithmetic carry-in to the least significant place of the addition performed therein. Thus, whenever complementer 150 produces a word which is the one's complement of an applied data word (in which case binary one is the control signal applied to terminal SIGN), the application of the signal at terminal SIGN to adder 152 as described above changes the effect of that one's-complement word to the effect of the equivalent two's-complement word. On the other hand, when the signal applied to control terminal SIGN is binary zero, the applied data word is passed unaltered by complementer 150 but by the same token the application of the SIGN control signal (i.e., binary zero) to adder 152 has no effect on the operation taken place in that device. By the combined operation of devices 150 and 152 (and provided gating device 158 is enabled), any two's-complement quantity applied to arithmetic unit 192 can be added to or subtracted from the contents of accumulator 156, depending on whether binary zero or one is applied to terminal SIGN. Gating device 158, similar to input device 100, is enabled by the application of a gate enabling control voltage to control terminal CLEAR.

On the application of a control voltage of a second level (designated the binary zero level or simply binary zero) to terminal MAGNITUDE, complementer 150 inhibits the data word applied to it. When the applied data word is thus inhibited, complementer 150 produces instead a data word representative of either binary zero or binary full scale depending on whether binary zero or binary one is applied to terminal SIGN. Binary full scale is, of course, merely the one's-complement of binary zero and can be rendered the two's-complement of binary zero (which is the same as binary zero) by adding binary one to the least significant place of the binary full scale word. This takes place in adder 152 by virtue of the application of control signal SIGN to that device as discussed above. These latter capabilities of complementer 150 have particular application in the performance of multiplication operations.

As has been mentioned, any two's-complement quantity applied to arithmetic unit 192 can be multiplied by any positive or negative (multiplier) quantity by selective repeated addition or subtraction of the applied (multiplicand) quantity to or from the accumulator. In addition to the sign of the multiplier quantity being applied to complementer 150 and adder 152 by way of control terminal SIGN, the magnitude bits of that quantity are sequentially applied, least significant first, to complementer 150 by way of terminal MAGNITUDE. Each time binary one is thus applied to terminal MAGNITUDE, an addition or subtraction of the multiplicand quantity takes place depending on the signal applied to terminal SIGN. Each time binary zero is applied to terminal MAGNITUDE, the multiplicand quantity is blocked by complementer 150 and zero added to the contents of accumulator 156. It will be obvious, therefore, that the arithmetic quantities to be used as multipliers will most conveniently be stored (in the control apparatus of FIG. 2) in sign-magnitude form, binary zero being employed for the sign bit of positive multiplier quantities and binary one being employed for the sign bit of negative multiplier quantities.

During the course of a multiplication, the multiplicand quantity is added to or subtracted from the contents of accumulator 156 at the appropriate numerical significance relative to the contents of accumulator 156 by reducing the significance of the latter quantity by one binary place each time that quantity is applied to adder 152 as part of a multiplication operation. If serial arithmetic is being employed, this shift in significance can be accomplished by delaying the bits of the accumulator contents relative to the bits of the word produced by complementer 150. When simple addition or subtraction is to be performed (i.e., an addition or subtraction which is not part of a multiplication), this delay can be by-passed. If parallel arithmetic is being employed, the required shift can be realized by connecting each accumulator output lead to an adder input lead having numerical significance less by one binary place than the corresponding accumulator output place. Before performing any addition or subtraction not associated with a multiplication, this wired right shift can be compensated for by first shifting the contents of the accumulator to the left by an appropriate number of binary places. Thus, when parallel arithemetic is employed, device 156 must be both a parallel accumulator and a left shift register, the mode of its operation being determined by the level of the control signal applied to terminal MODE. Regardless of the type of arithmetic being performed, device 156 is preferably a device of the type which stores an applied quantity or shifts a stored quantity in response to a clock pulse applied by way of enabled AND gate 154. AND gate 154 may be enabled by application of a gate enabling control voltage terminal ENABLE ACCUMULATOR. The control signals applied to terminals MODE and ENABLE ACCUMULATOR are among those generated by the control apparatus of FIG. 2.

Arithmetic unit 192 can be cleared of the quantity stored in accumulator 156 by applying a gate disabling voltage to control terminal CLEAR during any addition or subtraction cycle. Application of such a control voltage to terminal CLEAR disables device 158, thereby inhibiting the path or paths by which the contents of accumulator 156 are applied to adder 152. The former contents of acumulator 156 are therefore lost or cleared when that device changes state to store any newly applied adder output word.

By simultaneously enabling devices 158 and 160 (both of which may be similar gating devices), the contents of accumulator 156 may be returned to storage unit 190 by way of bus 101. For the purpose of enabling device 160, a gate enabling control voltage, generated by the control apparatus of FIG. 2, may be applied to terminal READ ACCUMULATOR. Any data word applied to storage unit 190 by way of bus 101 may be stored in either or both of one word storage registers 112 or 122 as discussed above.

FIG. 4 outlines an algorithm whereby a second order filtering operation similar to that performed by the filter of FIG. 1 can be performed in the apparatus of FIG. 3 just discussed. As a first step, step 1 in FIG. 4, a two's-complement binary coded signal sample, applied to the apparatus of FIG. 3 by way of bus 99 is applied to bus 101 by way of enabled input device 100 and stored in register 112. In step 2, quantity X, the data word in the output stage of first order data memory 132 is multiplied by filter coefficient E. In the first multiplication cycle, accumulator 156 is, of course, cleared by inhibiting gating device 158. During succeeding multiplication cycles device 158 is enabled and the product of quantities X and E gradually accumulated in accumulator 156. In step 3, quantity I, the most recently stored sample, is applied to arithmetic unit 192 for addition to the product of X and E. Advantageously, the binary points in data words and coefficients are positioned to minimize the shifting necessary to make possible the addition of a data word like quantity I and a multiplication product stored in accumulator 156. If, for example, parallel arithmetic is being performed, the binary significance of completed products stored in accumulator 156 can be made equivalent to the binary significance of any data word applied to arithmetic unit 192 so that accumulator 156 need only be shifted to the left one binary place (to compensate for the wired right shift in the feedback connection between accumulator 156 and adder 152) before adding any applied data word to any stored product. Step 3 necessarily includes this left shift as a prelude to the addition of quantity I to the stored product of X and E. In step 4, the resulting quantity is returned to storage register 112, thereby freeing arithmetic unit 192 for further arithmetic operations.

In step 5, quantity Y is multiplied by filter coefficient D in the manner discussed above and the product stored in accumulator 156. In step 6, quantity I is added to the product of Y and D and the sum stored in the accumulator. It will be observed that this stored quantity is identical to that produced by adder 20 in the prior art filter of FIG. 1. In step 7 this quantity is transferred to storage registers 112 and 122.

In steps 8 through 13, quantities X and Y are multiplied by feed-forward filter coefficients C and B, respectively. Each of the resulting products is added to the contents of storage register 122 (i.e., to quantity J) and the result returned to register 122. At the conclusion of step 13, storage register 122 contains a quantity identical to that produced by adder 38 of the prior art filter of FIG. 1 while register 112 still contains a quantity identical to that produced by adder 20.

In step 14, data memories 132 and 142 are both shifted by one stored word in the direction of their respective output stages. As a result, memory 132 stores quantity I in its input stage and memory 142 stores former quantity X. Former quantity Y is lost and new quantities X and Y appear.

In step 15, quantity J is multiplied by coefficient A and the product stored in accumulator 156. The quantity is, of course, equivalent to an output word produced by the prior art filter of FIG. 1. In step 16 the contents of accumulator 156 are returned to storage register 112.

Omitting step 1 in all but the first repetition, the filtering operation outlined in FIG. 4 can be repeated any number of times, *p*, to produce a filtering function equivalent to *p* cascaded second order filter sections. Associated with each repetition of the second order filtering algorithm of FIG. 4 is a unique set of coefficients A through E. Moreover, since each repetition of this algorithm includes computing a recursive quantity (i.e., the quantity present in register 112 at the end of step 7) and shifting or displacing the contents of memories 132 and 142 in order to store that computed recursive quantity (step 14), new quantities X and Y appear for use in each repetition of the filtering algorithm.

In all but the first of each such series of *p* repetitions of the algorithm of FIG. 4, the input quantity or the quantity on which each second order filtering operation is performed is the output quantity of the preceding second order filtering operation. This quantity is a nonrecursive quantity (i.e., the quantity present in register 122 at the end of step 13) multiplied by a scaling coefficient A (step 15). Just as any applied sample is stored in register 112 as the first step in the first of the $p$ repetitions of the basic algorithm, the input quantities for the succeeding repetitions of the algorithm are also stored in register 112 (step 16).

At the conclusion of any given series of $p$ repetitions of the second order filtering algorithm of FIG. 4, the last scaled nonrecursive quantity (i.e., the quantity stored in register 112) is withdrawn from the filter as a digitally coded discrete time filtered output word. This is accomplished by applying a gate enabling voltage to terminal READ I and at the same time enabling output storage register 180 (similar to register 112 or 122) by the concurrence of a gate enabling voltage at terminal ENABLE OUTPUT and a clock pulse at terminal CLOCK. This output quantity may thereafter be applied to any desired utilization device.

Once the desired output quantity has been stored in register 180, another series of $p$ second order filter operations can be performed, either on a new sample from the same source (in the event that data from only one source is being processed) or on a sample from the second of several sources. This second series of $p$ repetitions of the algorithm of FIG. 4 may be carried out either with the same or with new filter coefficients. In general, $p$ second order filtering operations can be performed on one sample from each of $q$ sources by means of $p$ times $q$ repetitions of the algorithm of FIG. 4. This cycle is repeated ad infinitum to produce an on-going filtering operation.

Figure 5A:
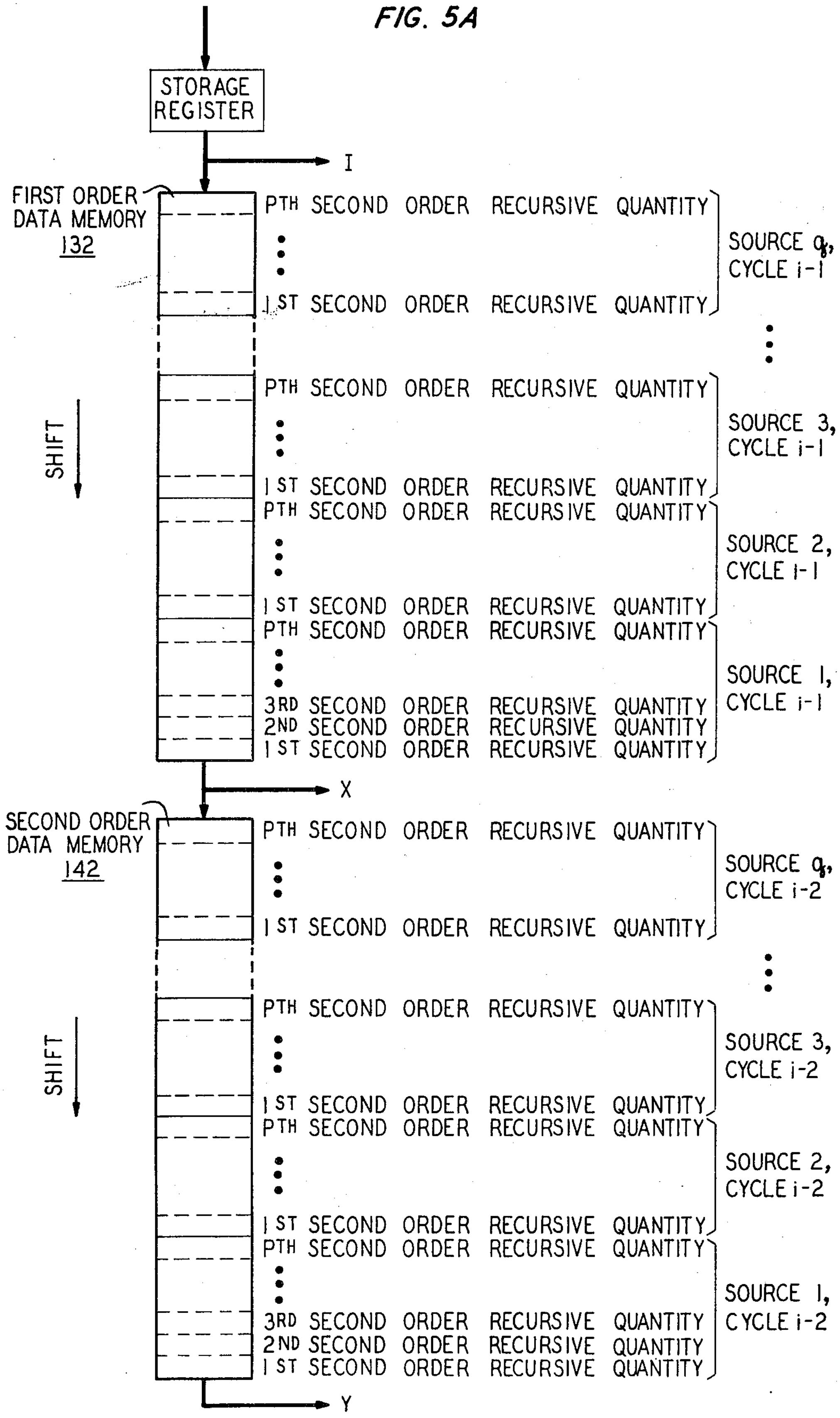
FIG. 5A illustrates the information stored in the data processing apparatus of FIG. 3 at a particular time in the operation of that apparatus.
Figure 5B:
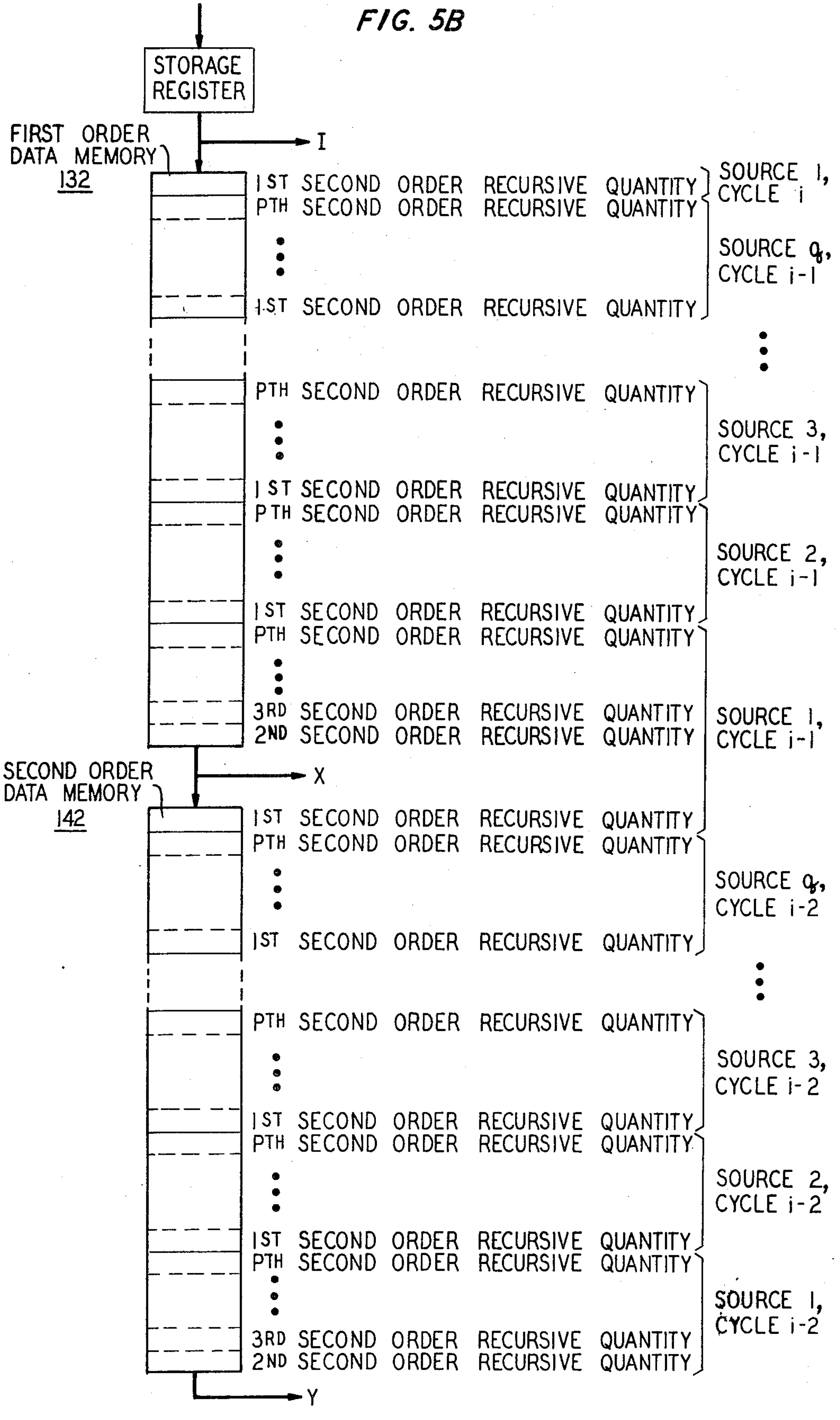
FIG. 5B illustrates the information stored in the data processing apparatus of FIG. 3 at another time in the operation of that apparatus.

FIG. 5A illustrates the contents of first and second order data memories 132 and 142 at the start of the $i^{th}$ filter cycle. As the $i^{th}$ sample from the first of $q$ sources is applied to the filter, the final or output stage of memory 132 contains the recursive quantity computed during the first second order filtering operation in the preceding filter cycle (i.e., cycle $i-1$). Similarly, the output stage of memory 142 contains the corresponding recursive from cycle $i-2$. These quantities (i.e., quantities X and Y, respectively) are employed as discussed in detail above to compute new recursive and nonrecursive quantities in a first repetition of the second order filtering algorithm of FIG. 4. At the appropriate time in the resulting second order filtering operation (i.e., step 14 in the algorithm of FIG. 4) the contents of memories 132 and 142 are shifted by one word in the direction of their respective output stages with the result that the contents of these devices assume the configuration shown in FIG. 5B. As shown in FIG. 5B, there is a newly stored recursive quantity (i.e., the recursive quantity computed in the current second order filtering operation) in the first or input stage of memory 132. This quantity will emerge as quantity X after memory 132 has been shifted an appropriate number of times, that is, after $p$ second order filtering operations have been performed on one sample from each of the $q$ sources. Similarly, former quantity X, having been employed as needed in the current filtering operation, has passed to the input stage of memory 142 to emerge as quantity Y at the same time that the quantity most recently stored in memory 132 becomes quantity X. Finally, there are, as a result of the shifting of memories 132 and 142, new quantities X and Y available for use in the second order filtering operation to follow completion of the current operation.

In general, the recursive quantity computed in each repetition of the basic algorithm is stored for use in the corresponding repetition in the two succeeding filter cycles (i.e., first as quantity X and then as quantity Y). Since each filter cycle involves $p$ times $q$ repetitions of the basic algorithm and hence the computation of $p$ times $q$ recursive quantities, each of which is not again needed (as quantity X) until $p$ times $q$ repetitions after the repetition in which it was computed, memory 132 is provided with capacity for storing $p$ times $q$ recursive quantities. Similarly, each of quantities X is not again needed (as quantity Y) until $p$ times $q$ repetitions after the repetition in which it appears as quantity X. Memory 142 is therefore also provided with capacity for storing $p$ times $q$ recursive quantities. Memories 132 and 142 may have capacities in excess of the product of any particular values of $p$ and $q$ as long as means are provided for short circuiting capacity unused in any particular application. On the other hand, the capacities of these memories act as an upper bound on parameters $p$ and $q$ in that the product of any particular values of $p$ and $q$ may not exceed the number of words which can be stored in either of memories 132 and 142.

The apparatus of FIG. 3 is controlled in accordance with the algorithm of FIG. 4 by means of the control circuitry of FIG. 2, i.e., clock 200, counter 202, and instruction and coefficient memories 204 and 206, mentioned briefly above. This control circuitry applies the required bilevel control signals to the labelled terminals of the apparatus of FIG. 3 as shown in FIG. 2.

Clock 200, which may be any suitable timing signal generator, produces a series of timing pulses (see FIG. 6A) which is applied to control terminal CLOCK and to instruction counter 202. Instruction counter 202, which may be any suitable ring counter or stepping switch, addresses sequential portions of instruction and coefficient memories 204 and 206 may be any suitable memory devices, e.g., magnetic core memories or fixed diode matrix memories. Each addressable portion of memories 204 and 206 contains a stored instruction which determines the level of the bilevel control signal to be applied to each of the control terminals in FIG. 2 other than terminal CLOCK. The conditions of or the information stored in memories 204 and 206 may be conveniently depicted, at least in part, as shown in FIGS. 6B and 6C, respectively. Each horizontal row in the matrices of FIGS. 6B and 6C represents one instruction the function of which is noted in the left-hand margin of the matrix of FIG. 6B. Each instruction is addressed by counter 202 during the corresponding cycle in the timing signal of FIG. 6A. Each one or zero in each of these instructions indicates the level of the control signal voltage to be applied to the control terminal identified at the top of the matrix column in which that one or zero appears. The indicated conditions continue only during the timing or instruction cycle in which the instruction of interest is addressed. In particular, binary one in any of columns READ SOURCE, ENABLE I, READ I, ENABLE J. READ J, READ X, READ Y, ENABLE ACCUMULATOR, CLEAR, READ ACCUMULATOR, SHIFT, or ENABLE OUTPUT indicates that a gate enabling voltage is to be applied to the similarly labelled control terminal. Binary zero in any of these columns indicates that a gate inhibiting voltage is to be applied. Binary zero in column MODE indicates that the control voltage to be applied to terminal MODE is that which will cause accumulator 156 to shift a parallel stored quantity to the left when it is next enabled. A binary one in column MODE indicates that this control voltage is to be that which will cause accumulator 156 to store an applied parallel quantity. These alternative functions of accumulator 156 have been discussed in detail above. Similar functions can be controlled by the control signal applied to terminal MODE in the event that serial arithmetic is being performed. The functions controlled by the signals applied to terminals SIGN and MAGNITUDE have already been discussed in detail in connection with complementer 150 and adder 152 of the apparatus of FIG. 3. As was mentioned there, these signals must respectively represent the sign and magnitude bits of the filter coefficients. The binary designations mentioned in that discussion are such that these coefficients can be stored in coefficient memory 206 in sign-magnitude form. Accordingly, entries S in column SIGN are to be understoood as representing the sign (zero for positive and one for negative quantities) of the filter coefficient identified in the left margin of the matrix of FIG. 6C. Entries $\delta_i$ in column MAGNITUDE similarly represent the several magnitude bits of the identified coefficient, least significant bit first. In addition, other ones and zeroes in column MAGNITUDE not associated with any filter coefficient indicate control signal voltage levels to be applied to terminals SIGN and MAGNITUDE during instruction cycles other than those associated with multiplication operations.

FIGS. 6B and 6C represent only those instructions necessary to perform one second order filtering operation and therefore correspond to one repetition of the algorithm of FIG. 4. The first step in FIG. 4, for example, is implemented by the first instruction in FIGS. 6B and 6C which, by virtue of binary ones in columns READ SOURCE and ENABLE I, indicates that gate enabling voltages are applied to terminals READ SOURCE and ENABLE I when that instruction is addressed. AND gates 100 and 110 in the apparatus of FIG. 3 are thereby enabled. When a pulse occurs in the signal applied to terminal CLOCK (see FIG. 6A), that pulse is applied to storage register 112 by way of enabled AND gate 110. Register 112 therefore stores the sample applied to the filter.

The next several instructions perform the required multiplication of quantity X by coefficient E. This is accomplished by several similar instructions in which ones occur in columns READ X, ENABLE ACCUMULATOR, MODE, and, with the exception of the first instruction, in column CLEAR. A one in column READ X indicates, of course, that quantity X is applied to arithmetic unit 192 during each multiply instruction cycle. A one in column MODE indicates that accumulator 156 will store an applied quantity rather than shift a stored quantity when it is enabled. The one in column ENABLE ACCUMULATOR indicates that AND gate 154 is enabled thereby allowing a clock pulse to be applied to accumulator 156 and causing that device to store the quantity applied to it during each multiply cycle. Once accumulator 156 has been cleared in the first multiply instruction cycle, ones in column CLEAR allow the contents of accumulator 156 to be applied to adder 152 during each succeeding multiply instruction cycle. As indicated by the entry $S_E$ in column SIGN in the matrix of FIG. 5C, the sign bit of coefficient E (zero or one for a positive or negative coefficient, respectively) is applied to control terminal SIGN during each of these multiply instruction cycles. In addition, the $n$ magnitude bits ($\delta_0$ through $\delta_{n-1}$) of coefficient E are applied to control terminal MAGNITUDE as indicated in column MAGNITUDE, one per multiply instruction cycle, in the order in which they are stored.

At the conclusion of the multiplication of quantities X and E, an instruction, labelled SHIFT LEFT in FIG. 6B and represented by zeroes in all the columns of FIG. 6B except column ENABLE ACCUMULATOR, causes accumulator 156 to shift its contents one binary place to the left (as indicated by the zero in column MODE) in preparation for the addition of the product stored therein and the contents of storage register 112.

The next instruction, labelled ADD I in FIG. 6B, causes quantity I and the contents of accumulator 156 to be applied to adder 152. In addition to the arrangement of ones and zeroes in the position of this instruction depicted in FIG. 6B, zero and one appear in columns SIGN and MAGNITUDE, respectively, in the matrix of FIG. 6C to indicate that control signals must be applied to terminals SIGN and MAGNITUDE in order to allow quantity I to be passed unaltered by complementer 150.

After the addition of quantity I to the product of quantities X and E and storage of the result in accumulator 156, that result must be transferred to storage register 112 as called for in step 4 of FIG. 4. This is accomplished by the instruction labelled TRANSFER TO I in FIG. 6B. In that instruction, ones in columns CLEAR and READ ACCUMULATOR indicate that control signals are applied to terminals CLEAR and READ ACCUMULATOR to enable gating devices 158 and 160, respectively. As a result, the contents of accumulator 156 are applied to storage unit 190 wherein storage register 112 is enabled to store that quantity. Register 112 is thus enabled by a clock pulse applied to terminal CLOCK during the latter portion of this instruction cycle. As indicated by the one in column ENABLE I in FIG. 6B, this pulse is applied to register 112 by way of enabled AND gate 110.

The remaining instructions represented by the matrices of FIGS. 6B and 6C, most of which are similar to those discussed above, implement the remaining steps in the algorithm of FIG. 4. They wil be readily understood without further discussion.

The plurality of second order filtering operations required to perform higher order filter functions on data from several sources may be realized by extending the memories represented by FIGS. 6B and 6C so that each is $p$ times $q$ times the size represented in FIGS. 6B and 6C. As is the foregoing discussion, $p$ and $q$ are respectively the number of second order filtering operation to be performed and the number sources from which data is to be derived. Accordingly, memories 204 and 206 thus extended would contain $p$ times $q$ repetitions of the instructions represented in FIGS. 6B and 6C with appropriately placed input and output instructions.

Any number of ways may be employed to reduce the required capacity of memories 204 and/or 206. For example, if data from all sources is to be subjected to the same filter transfer function, memories 204 and 206 need only be extended to $p$ times the sizes shown in FIGS. 6B and 6C. Even if different coefficients are to be used on data from each source, the basic filter operations are the same with respect to data from each source. Accordingly, instruction memory 204 can be provided with capacity for storage of instructions for $p$ second order filter cycles while coefficient memory 206 is arranged to store $p$ times $q$ separate sets of filter coefficients. It is then necessary to cycle through instruction memory 204 each time a new sample is applied from any source while coefficient memory 206 is cycled only after all coefficients heave been used. This may be accomplished by logic circuitry which selects the appropriate group of $p$ sets of filter coefficients for use during each cycle of the stored instructions. By making use of even more elaborate logic circuitry, the size of instruction memory 204 can be reduced still further. That memory may even be reduced to the size represented by the matrix of FIG. 6B if circuitry is provided to suppress the first or load instruction except during the first of each group of $p$ second order filter cycles and to include an unloading instruction as the last instruction in the last of each group of $p$ second order filter cycles.

It will be evident that parameters $p$ and $q$ of the filter of this invention can be changed to suit any particular applications simply by replacing memories 204 and 206 or by altering the contents of these memories so long as the product of parameters $p$ and $q$ does not exceed the number of data words which can be simultaneously stored in each of data memories 132 and 142. These changes in memories 204 and 206 can be made without changing the basic operating portion 220 of the filter. Accordingly, the filter of this invention is flexible to a considerable degree with respect to the order of the filter functions to be realized and the number of sources of data to be processed.

Figure 7B:
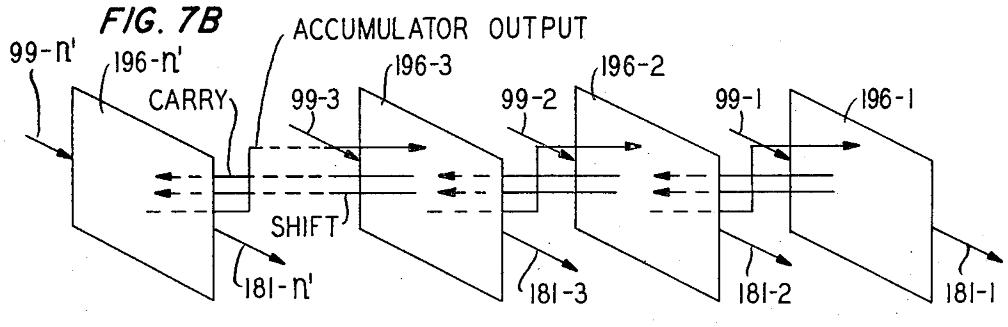
FIG. 7B is a block diagram showing the parallel connection of a plurality of the modules shown in FIG. 7A.
Figure 7A:
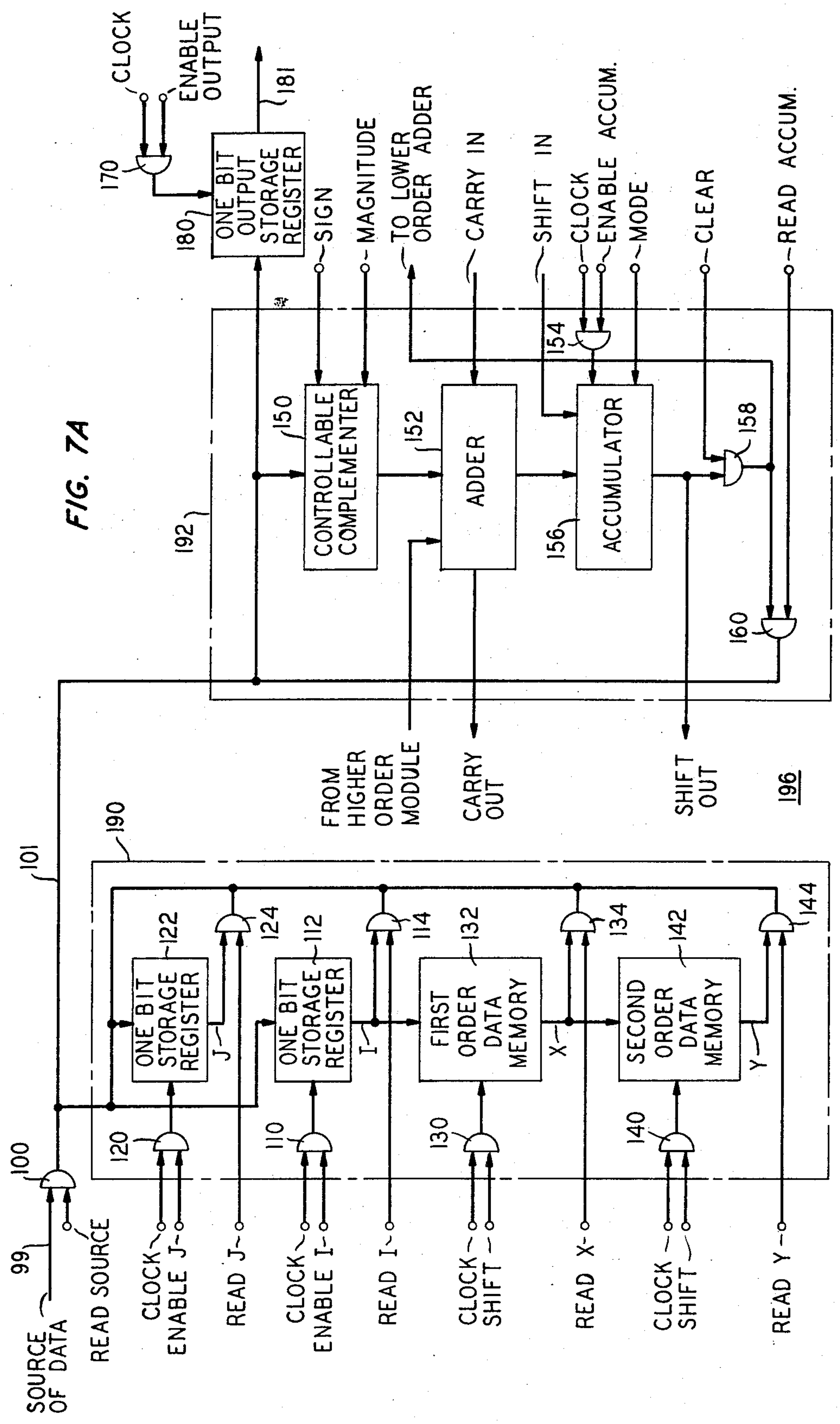
FIG. 7A is a block diagram of a typical filter module, several of which may be connected in parallel to realize the apparatus of FIG. 3.

When the filter of this invention is constructed to perform parallel arithmetic, the data processing portion of the filter can be made up of any number of identical filter modules (a typical one of which is shown in FIG. 7A) connected in parallel as shown in FIG. 7B. In the filter of FIG. 7B, each of modules 196-1 through 196-$n'$ operates on data from one binary place of samples applied to the filter. Filters of any desired computational accuracy can therefore be constructed using an appropriate number of filter modules. Although the filter module control terminals are not shown in FIG. 7B, it is to be understood that all similar terminals on all modules are connected together so that all modules are controlled to perform the same operations simultaneously.

Each of the components of the typical module shown in FIG. 7A, when combined with the corresponding components of other parallel modules, comprise the similarly identified components of the assembled filter shown in FIG. 3. Thus, for example, the one bit storage registers 112 of several parallel filter modules comprise one word storage register 112 in the apparatus of FIG. 3. Similarly, the first order data memories 132 of these filter modules comprise first order data memory 132 in the apparatus filter of FIG. 3. Each of one bit storage registers 112 and 122 may therefore be a bistable multivibrator or flip-flop device while each of memories 132 and 142 may be a shift register having capacity for storing one bit from each of at least $p$ times $q$ data words applied thereto.

Each of the devices included in arithmetic unit 192 in the typical module of FIG. 7A (i.e., complementer 150, adder 152, and accumulator 156) are devices which perform operations discussed above in connection with the filter of FIG. 3 but do so only on one binary place of data applied to that unit. Thus connections to adder 152 are shown whereby in the course of an addition operation any necessary arithmetic "CARRY IN" (from the corresponding adder in the next lower order module) or "CARRY OUT" (to the adder in the next higher order module) may be effected. "Order" in this context refers, of course, to the binary significance of the data being processed by a given module. Similarly, leads labelled "SHIFT IN" and "SHIFT OUT" are provided to enable accumulator 156 to act as a left shift register when appropriate control signals are applied to terminals CLOCK, ENABLE ACCUMULATOR, and MODE. Finally, the wired right shift in the feedback connections from accumulator 156 to adder 152 is implemented by means of the lead from the output terminal of AND gate 158 back to the adder of the next lower order filter module. Similarly, adder 152 has an input lead which is indicated to come from the next higher order module; in particular, from the output terminal of AND gate 158 of that module. Each of devices 150, 152, and 156 taken together with the corresponding devices in several parallel filter modules thereof comprise the similarly identified devices in the filter of FIG. 3.

It is to be understood that the embodiments shown and described herein are illustrative of the principles of this invention only, and that modifications may be implemented by those skilled in the art without departing from the spirit and scope of this invention. For example, although the filter discussed above is equivalent to a filter made up of cascaded second order filter sections, filters can be constructed according to the principles of this invention which are equivalent to cascaded sections of any order. A filter equivalent to cascaded sections of arbitrary order $m$ can be constructed by providing $m$ serially connected data memories, each similar to either of devices 132 or 142 shown in FIG. 3, and by making appropriate changes in the operating algorithm. This would, of course, necessitate additions to instruction and coefficient memories 204 and 206. Similarly, the basic operating algorithm need not be completely general as is true of the algorithm described in detail above. Thus it may be possible in some applications to choose filter coefficients such that one or more of the multiplications required in the general algorithm can be eliminated. For example, it is very often possible to eliminate scaling coefficients (i.e., coefficient A).

What is claimed is:

1. Apparatus for time sharing an arithmetic unit among $p$ cascaded digital filter operations, each of order $m$ and each performed on digitally coded signal samples from each of $q$ sources, comprising:

- means for storing an applied digitally coded signal quantity;
- $m$ serially connected multistage shift registers each having capacity for storing at least $p$ times $q$ sequentially applied digitally coded signal quantities;
- an arithmetic unit responsive to digitally coded signal quantities applied thereto for computing predetermined digital filter quantities;
- means for selectively applying to said arithmetic unit said quantity stored in said means for storing and the quantities represented by the output signals of said shift registers;
- means for sequentially applying said quantities computed by said arithmetic unit to said means for storing; and
- means for shifting said shift registers after said predetermined filter quantities have been computed.

2. Apparatus for time sharing an arithmetic unit among $p$ cascaded digital filtering operations, each of order $m$, each involving the computation of a recursive quantity and a nonrecursive quantity, and each performed on digitally coded signal samples from each of $q$ sources, comprising:

- means for storing an applied digitally coded signal quantity;
- means for applying one of said samples to said storing means at the start of each of a sequence of $p$ filtering operations;
- $m$ multistage shift registers serially connected to said storing means such that the quantity stored in said storing means is applied to the first of said shift registers, each of said shift registers having capacity for storing at least $p$ times $q$ sequentially applied digitally coded signal quantities, the first computed of said $p$ times $q$ stored quantities in each of said shift registers being the output quantity of said shift register;
- an arithmetic unit responsive to digitally coded signal quantities applied thereto for sequentially computing a recursive quantity and a nonrecursive quantity;
- means for selectively applying said quantity stored in said storing means and said shift register output quantities to said arithmetic unit;
- means for sequentially applying the recursive quantity and the nonrecursive quantity computed in each of said filtering operations by said arithmetic unit to said storing means; and
- means for shifting said shift registers during the interval of time when the recursive quantity computed in each of said filtering operations is stored in said storing means.

3. The method of performing $p$ sequential digital filtering operations, each of order $m$, on data from each of $q$ sequentially sampled sources comprising the steps of:

- storing an applied signal sample from one of said sources in a first storage register;
- computing a recursive quantity, the computation of said recursive quantity including $m$ repetitions of the steps of multiplying a distinct one of $m$ previously computed recursive quantities by an applied feedback filter coefficient, adding the contents of said first storage register to the product quantity, and storing the sum in said first storage register;
- storing said recursive quantity in a second storage register;
- computing a nonrecursive quantity, the computation of said nonrecursive quantity including $m$ repetitions of the steps of multiplying a distinct one of said m previously computed recursive quantities by an applied feed-forward filter coefficient, adding the contents of said second storage register to the product quantity, and storing the sum in said second storage register;
storing said computed recursive quantity in a third storage register;
multiplying said computed nonrecursive quantity by an applied scale factor;
storing the product of said nonrecursive quantity and said scale factor in said first storage register;
repeating all but the first of the foregoing steps $p-1$ times using a unique set of $m$ previously computed recursive quantities with each repetition;
detecting said nonrecursive quantity computed in the last of said repetitions to produce a digitally filtered output word; and
repeating all of the foregoing steps $q-1$ times using a unique group of $p$ sets of previously computed recursive quantities with each repetition.

4. The method of performing $p$ sequential digital filtering operations, each order $m$, on data from each of $q$ sequentially sampled sources comprising the steps of:
storing an applied signal sample from one of said sources in a first storage register;
computing a recursive quantity, the computation of said recursive quantity including $m$ repetitions of the steps of multiplying a distinct one of $m$ previously computed recursive quantities by an applied feedback filter coefficient, adding the contents of said first storage register to the product quantity, and storing the sum in said first storage register;
storing said recursive quantity in a second storage register;
computing a nonrecursive quantity, the computation of said nonrecursive quantity including $m$ repetitions of the steps of multiplying a distinct one of said $m$ previously computed recursive quantities by an applied feed-forward filter coefficient, adding the contents of said second storage register to the product quantity, and storing the sum in said second storage register;
storing said computed recursive quantity in a third storage register;
storing said nonrecursive quantity in said first storage register;
repeating all but the first of the foregoing steps $p-1$ times using a unique set of $m$ previously computed recursive quantities with each repetition;
detecting said nonrecursive quantity computed in the last of said repetitions to produce a digitally filtered output word; and
repeating all of the foregoing steps $q-1$ times using a unique group of $p$ sets of previously computed recursive quantities with each repetition.

5. Apparatus for performing $p$ sequential digital filtering operations, each of order $m$ and each involving the computation of a digitally coded recursive quantity and a digitally coded nonrecursive quantity, on data from each of $q$ sequentially sampled sources comprising:
control means for generating a plurality of bilevel control signals;
a first storage register responsive to signals from said control means for storing an applied digitally coded data word;
means responsive to signals from said control means for applying a sample from one of said sources to said first storage register at the start of each sequence of $p$ digital filtering operations;
a second storage register responsive to signals from said control means for storing an applied digitally coded data word;
$m$ serially connected shift registers, the first of said shift registers being connected to said first storage register such that the quantity stored in said first storage register is applied to said first shift register upon the application of a signal from said control means, each of said shift registers having capacity for storing at least $p$ times $q$ sequentially applied data words;
means responsive to signals from said control means for multiplying the data word represented by the output signal of each of said shift registers by an applied feedback filter coefficient quantity and for adding each product thus computed to the data word stored in said first storage register to produce the recursive quantity associated with each filtering operation in each sequence of $p$ filtering operations;
means responsive to signals from said control means for applying said computed recursive quantity to said second storage register;
means responsive to signals from said control means for multiplying the data word represented by the output signal of each of said shift registers by an applied feed-forward filter coefficient quantity and for adding each product thus computed to the data word stored in said second storage register to produce the nonrecursive quantity associated with said recursive quantity stored in said first storage register;
means responsive to signals from said control means for shifting said shift registers such that said recursive quantity stored in said first storage register is stored in said first of said shift registers;
means responsive to signals from said control means for multiplying said nonrecursive data word by an applied scaling coefficient;
means responsive to signals from said control means for applying the product of said nonrecursive quantity and said scale factor to said first storage register; and
means responsive to signals from said control means for detecting the data word stored in said first storage register at the conclusion of each sequence of $p$ filtering operations.

6. The apparatus defined in claim 5 wherein said means for multiplying by applied feedback coefficients, said means for multiplying by applied feed-forward coefficients, and said means for multiplying by an applied scaling coefficient comprise a single time-shared arithmetic unit.

7. The apparatus defined in claim 6 wherein said control means further comprises:
an instruction memory for storing a plurality of coded instructions; and
means for sequentially addressing said instructions to produce said plurality of bilevel control signals.

8. The apparatus defined in claim 7 wherein said control means further comprises:
a coefficient memory for storing a plurality of coded feedback, feed-forward, and scaling coefficients; and
means for sequentiailly applying said stored coefficients to said time-shared arithmetic unit.

9. Apparatus for performing $p$ successive digital filtering operations, each of order $m$, on digitally coded signal samples from each of $q$ sources comprising:
means for storing each applied sample at the start of each sequence of $p$ filtering operations;
$m$ multiword shift registers connected in series with said means for storing, each of said shift registers having capacity for the simultaneous storage of at least $p$ times $q$ sequentially applied digitally coded data words;
a time-shared arithmetic unit selectively responsive to said means for storing and to said output words of each of said shift registers for sequentially computing a recursive and a nonrecursive digitally coded quantity in each of said filtering operations;
means for applying said recursive quantity computed in each of said filtering operations to said means for storing wherein said recursive quantity is stored until the corresponding nonrecursive quantity has been computed;

means for shifting said shift registers to store said recursive quantity; and
means for applying a quantity proportional to said nonrecursive quantity computed in each of said filtering operations to said means for storing after said shift registers have been shifted.

10. Apparatus for performing *p* sequential digital filtering operations, each of order *m*, on sequential digitally coded signal samples from each of *q* sources, each of said filtering operations involving computation of a recursive and a nonrecursive digitally coded data word, comprising:
first and second one word data storage units;
means for applying one of said samples to said first one word data storage unit at the start of each sequence of *p* filtering operations;
*m* multiword data storage units connected in series with said first one word data storage unit, each of said multiword storage units having capacity for the simultaneous storage of at least *p* times *q* sequentially applied data words;
an arithmetic unit selectively responsive to the data words stored in said one word data storage units and to the output words of said multiword data storage units for sequentially computing the recursive and nonrecursive data words associated with each of said filtering operations;
means for applying each of said computed recursive data words to said first and second one word data storage units;
means for applying the recursive data word stored in said first one word storage unit to the first of said serially connected multiword storage units and for applying said output word of each of said serially connected multiword storage units to the next of said multiword storage units; and
means for applying each of said nonrecursive data words to said first one word storage unit.

11. Apparatus for performing *p* sequential digital filtering operations, each of order *m*, on sequentially applied samples from each of *q* sources comprising:
first means for storing an applied digitally coded data word;
second means for storing an applied digitally coded data word;
means for applying one of said samples to said first means for storing at the start of each of a sequence of *p* filtering operations;
*m* multiword shift registers connected in series with said first means for storing, each of said shift registers having capacity for storing at least *p* times *q* sequentially applied digitally coded data words representative of arithmetic combinations of applied data words;
an arithmetic unit selectively responsive to the data words stored in said first and second means for storing and to the output words of said multiword data storage units for sequentially computing the recursive and nonrecursive data words associated with each of said filtering operations;
means for applying said data word stored in said first means for storing to said arithmetic unit;
means for applying said data word stored in said second means for storing to said arithmetic unit;
means for applying the data words represented by the output signals of said shift registers to said arithmetic unit;
means for applying said arithmetic unit output words to said first and second means for storing; and
means for applying said data word stored in said first means for storing to a utilization device as a digitally filtered digitally coded output word.

12. The apparatus defined in claim 11 wherein said arithmetic unit further comprises:
complementer means for selectively negating or inhibiting each data word applied to said arithmetic unit;
adder means responsive to the output signal of said complementer for adding the data word represented by that output signal and an applied data word;
accumulator means for storing the data word represented by the output signal of said adder; and
means for applying the data word stored in said accumulator to said adder means.

13. Apparatus for performing *p* sequential digital filtering operations, each of order *m*, on sequentially applied samples from each of *q* sources comprising:
common connecting means;
first means for storing a data word connectable to said connecting means;
second means for storing a data word connectable to said connecting means;
*m* serially connected multiword shift registers, each of said shift registers having capacity for storing at least *p* times *q* sequentially applied data words;
means for applying said data word stored in said first means for storing to the first of said serially connected shift registers;
means for applying said data word stored in said first means for storing to said connecting means;
means for applying said data word stored in said second means for storing to said connecting means;
means for applying the data word represented by the output signal of any one of said shift registers to said connecting means;
an arithmetic unit selectively responsive to data words applied to said connecting means for producing output words representative of predetermined algebraic combinations of said applied data words and applied filter coefficient quantities; and
means for applying said arithmetic unit output words to said connecting means.

14. The apparatus defined in claim 13 wherein said arithmetic unit further comprises:
controllable complementer means for selectively negating and inhibiting data words applied to said arithmetic unit;
adder means responsive to the output signal of said complementer means for adding the data word represented by that output signal and an applied data word;
accumulator means for storing the data word represented by the output signal of said adder;
means for applying the data word stored in said accumulator to said adder means; and
means for applying the data word stored in said accumulator to said connecting means.

15. A digital filter for performing a series of *p* successive, second order filtering operations, each second order filtering operation including the computation of digitally coded recursive and nonrecursive signal quantities, on sequential, digitally coded signal samples from each of *q* sources, each of said samples having *n'* binary places, said filter comprising:
a control unit;
*n* signal processing filter modules connected in parallel, each module processing data from one binary place of said samples under control of signals from said control unit and each module further comprising:
a one bit memory device for storing one bit of one of said digitally coded quantities, including said signal samples, in response to signals from said control unit;
first and second multistage shift registers each having capacity for storing one bit of each of *p* times *q* digitally coded quantities, said one bit memory device and said shift registers being connected in series;
an arithmetic unit responsive to said control unit for performing on the quantities stored in said one bit memory and in the final stages of said shift registers said computation of said recursive and nonrecursive quantities in each of said second order filtering operations and for storing said quantities;

means responsive to said control unit, during each of said second order filtering operations, for storing in said one bit memory device said computed recursive quantity;

means for shifting said shift registers and simultaneously introducing into said first shift register said computed recursive quantity stored in said one bit memory device; and means for storing in said one bit memory device said computed nonrecursive quantity;

and means for detecting the digitially coded quantities stored in said one bit memory devices of said $n'$ filter modules at the completion of each of said series of $p$ successive second order filtering operations.

References Cited

UNITED STATES PATENTS

| | | | |
|---|---|---|---|
| 3,278,904 | 10/1966 | Lekven | 340—172.5 |
| 3,414,819 | 12/1968 | Lucky | 333—18 |
| 3,314,015 | 4/1967 | Simone | 333—18 |
| 3,414,845 | 12/1968 | Lucky | 333—18 |
| 3,573,623 | 4/1971 | Bannon et al. | 333—18 |

PAUL J. HENON, Primary Examiner

M. E. NUSBAUM, Assistant Examiner

U.S. Cl. X.R.

333—18